United States Patent [19]
Hoplock

[11] 3,914,029
[45] Oct. 21, 1975

[54] MIRROR ASSEMBLY

[76] Inventor: Donald A. Hoplock, 2801-55 Nassau St., Winnepeg, Manitoba, Canada

[22] Filed: Apr. 25, 1974

[21] Appl. No.: 464,068

[52] U.S. Cl. .............................. 350/289; 248/487
[51] Int. Cl.² ...................... G02B 5/08; A47G 1/24
[58] Field of Search .......... 350/289, 288, 293, 296, 350/299, 301, 304, 307, 6, 7, 279, 25, 26; 35/58; 353/98, 99, 62; 250/203 R; 248/484, 487

[56] References Cited
UNITED STATES PATENTS

| | | | |
|---|---|---|---|
| 2,368,959 | 2/1945 | Winslow | 248/487 |
| 2,877,686 | 3/1959 | Foster | 350/289 |
| 3,023,315 | 2/1962 | Muskat | 350/7 |
| 3,628,862 | 12/1971 | Stephenson | 350/289 |
| 3,722,984 | 3/1973 | Brean | 350/289 |

Primary Examiner—Ronald L. Wibert
Assistant Examiner—Jon W. Henry
Attorney, Agent, or Firm—Stanley G. Ade

[57] ABSTRACT

A yoke is mounted on an adjustable tripod base and a motor supplies power to rotate the yoke within limits, around a vertical axis. A planar mirror is held within the yoke and a further motor extends through one arm of the yoke to rotate the mirror within limits, around a horizontal axis. Microswitches control the degree of rotation in both axes.

6 Claims, 5 Drawing Figures

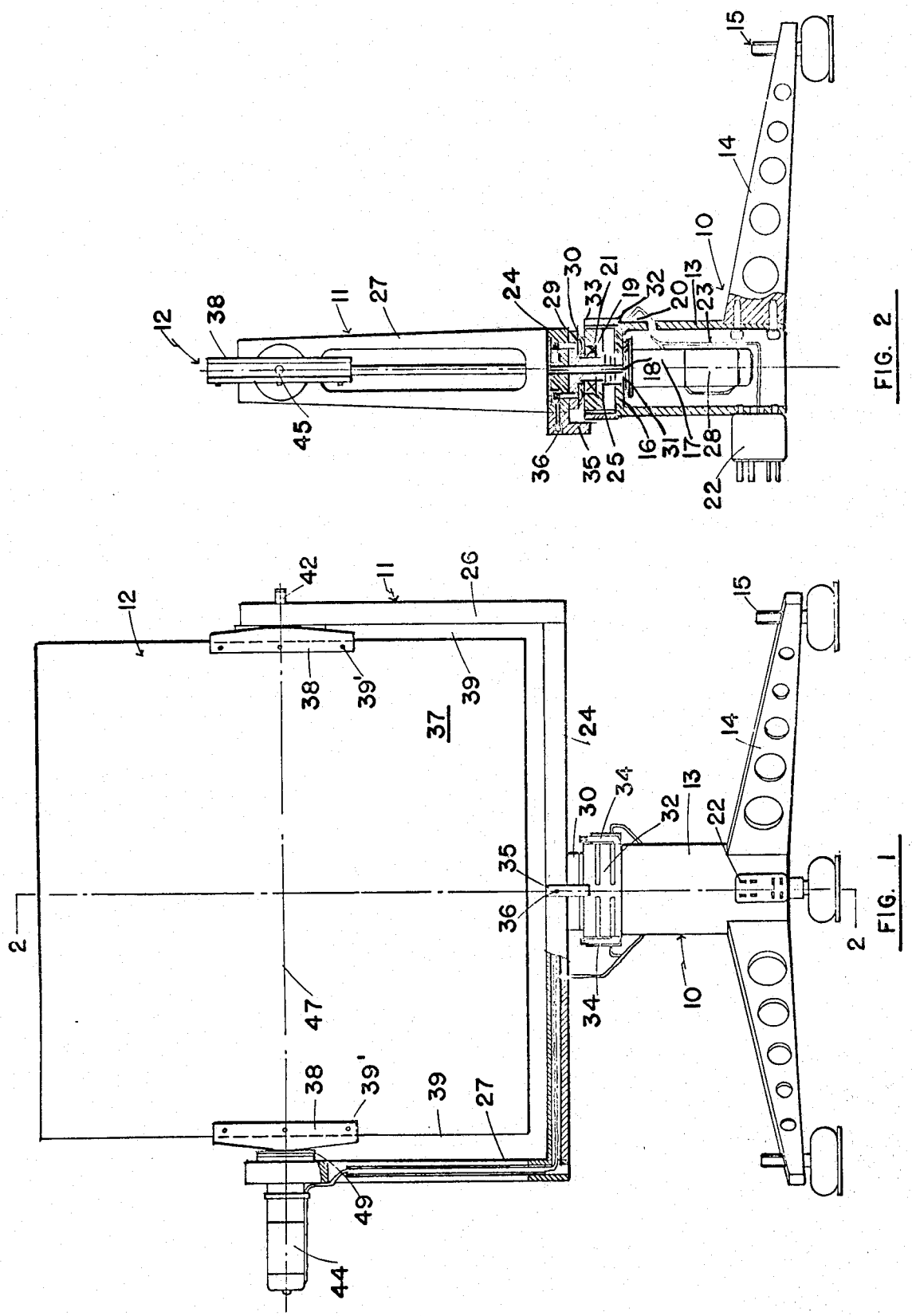

3,914,029

MIRROR ASSEMBLY

BACKGROUND OF THE INVENTION

This invention relates to new and useful improvements in mirror assemblies, particularly mirror assemblies adapted to be used in planetaria in conjunction with a projector so that the image may be swept across the dome both vertically and horizontally.

A desirable feature of planetarium projectors is to provide a mirror system which can project images on the dome and can move the images across the dome in any desired direction and at any desired speed.

Most of the equipment used for this purpose is incapable of providing smooth movement together with full flexibility thus preventing the projection equipment from realizing its full potential.

SUMMARY OF THE INVENTION

The present invention overcomes these disadvantages by providing a mirror system which is particularly suitable for use with a zoom type projector.

Electric motors control the movement of the mirror component around a horizontal and vertical axis at varying speeds and means are provided to ensure smooth vibration-free movement.

The principal object and essence of the invention is therefore to provide a mirror assembly which can be rotated around horizontal and vertical axes by means of electrical motors, the speed of which may vary as desired.

Another object of the invention is to provide a device of the character herewithin described which includes means to eliminate any vibration or jerkiness which may occur during the rotation of the mirror component, it being understood that the slightest irregularity of movement is magnified many times upon the dome of the planetarium.

Still another object of the invention is to provide a device of the character herewithin described which is simple in construction, economical in manufacture, and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

BRIEF DESCRIPTION OF THE DRAWINGS

FIG. 1 is a front elevation of the device.

FIG. 2 is a side sectional view substantially along the line 2—2 of FIG. 1.

In the drawings like characters of reference indicate corresponding parts in the different figures.

DETAILED DESCRIPTION

Figure 3:
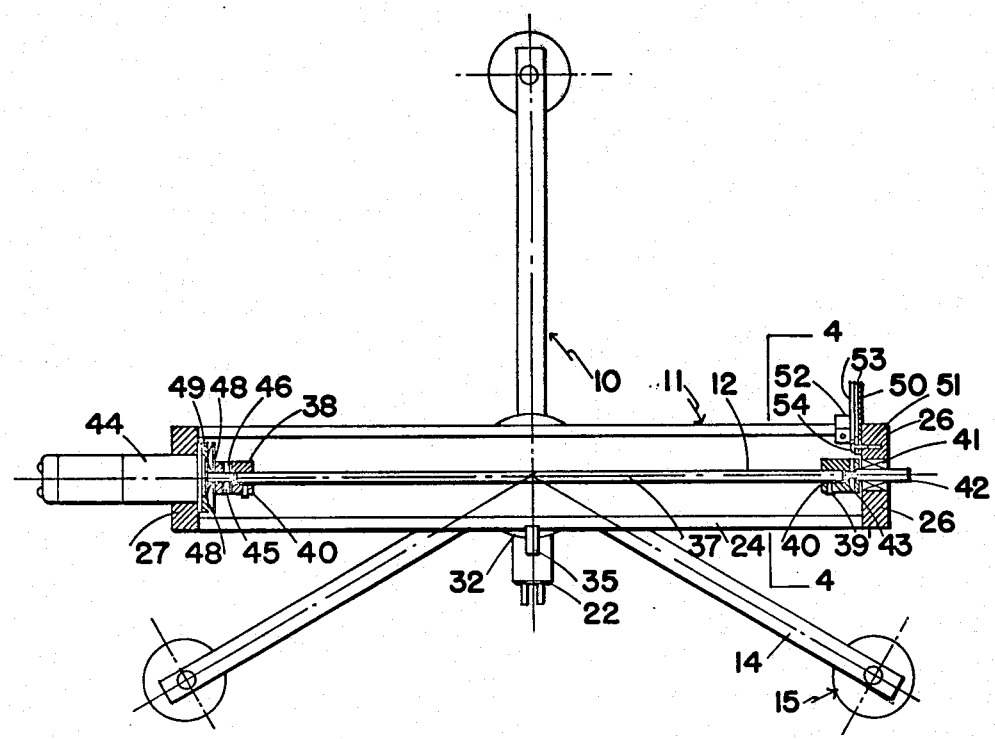
FIG. 3 is a top plan view of FIG. 1, sectioned in part to show the interior thereof.

Proceeding therefore to describe the invention in detail, reference should be made to the accompanying drawings in which 10 illustrates generally, a base, 11 a yoke, and 12 a mirror component.

In detail, the base, in this embodiment, is of a tripod configuration although of course four supports can be utilized, if desired.

It consists of a central hollow post 13 having three legs 14 extending radially outwardly and being secured equidistantly around the base of the post 13. Each of these legs is provided with a conventional levelling pad assembly 15 adjacent the distal ends thereof for levelling purposes.

A plate 16 is provided at the top of the post 13 and a D.C. electric motor 17 is situated within the post 13 with the drive shaft 18 extending upwardly through an aperture in the plate 16.

A bearing support 19 is situated above plate 16 and spaced therefrom by means of collar 20 and a bearing 21 is situated within the support as clearly shown in FIG. 2.

A multi-pin electrical connector 22 is secured adjacent the base of the post or standard 13 for connection to a source of electrical energy as will hereinafter be described, and electrical conductors 23 extend between this connector and the electric motor 17.

The yoke 11 includes a substantially horizontal base 24 extending outwardly upon each side of a mounting shaft 25 and a pair of vertically extending arms 26 and 27 extend upwardly from the ends of the base 24 in spaced and parallel relationship one with the other.

The mounting shaft 25 is secured within the bearing 21 so that the yoke is bearingly supported upon the central standard 13 for rotation around a vertical axis indicated by reference character 28 in FIG. 2.

Flexible frictional pads 29 are situated between a boss 30 surrounding the mounting shaft 25, and the bearing support 19 and smooth out the rotational movement of the yoke relative to the base 10. The mounting shaft 25 is secured to the drive shaft 18 of the motor 17 by means of set screws 31 seen in FIG. 2.

Means are provided to limit the rotational movement of the yoke relative to the base comprising a ring 32 surrounding the sleeve 20 and being secured to the bearing support 19 by means of set screws 33.

A pair of microswitches 34 are secured to the ring and a striker plate 35 is secured to the base 24 of the yoke, and centrally thereof, by means of a set screw 36. This striker plate is positioned so that it will engage either of the micro-switches 34 at the extremities of the desired rotation of the yoke around the vertical axis 28, it being understood that contact of either of the microswitches will cut the power and stop the rotation.

The mirror component 12 in the present embodiment, consists of a substantially rectangular planar silver-plated mirror 37 being held between a pair of clamps 38 engaging opposite vertical edges 39 of the mirror 37 and being clamped thereto by means of set screws 39'. In this connection, a friction strip 40 is provided between the ends of the set screws and the surface of the mirror 37 (see FIG. 3).

A bearing 41 is provided within the upper end of one of the arms 26 of the yoke 11 and a mounting shaft 42 is bearingly supported within this bearing. The inner end of this mounting shaft is secured to one of the clamps 38 by means of set screws 43 thus supporting this side of the mirror for rotation within the arm 26.

A second electric motor 44 is secured within the upper end of the other arm 27 and extends outboard therefrom as clearly shown with the drive shaft 45 extending inwardly and being secured to the other clamp 38 by means of set screws 46 (see FIG. 3). This means that the motor 44 can rotate the mirror component around a horizontal axis indicated by reference character 47. A friction pad 48 is provided between spacers 49 between the motor 44 and the clamp 38, one of the spacers being fixed to the yoke arm 37 and the other to the clamp 38. The provision of the friction pad 48 and the spacers 49 eliminate any irregularities of movement of the mirror component by the electric motor 44 and smooth out the rotation thereof.

Figure 4:
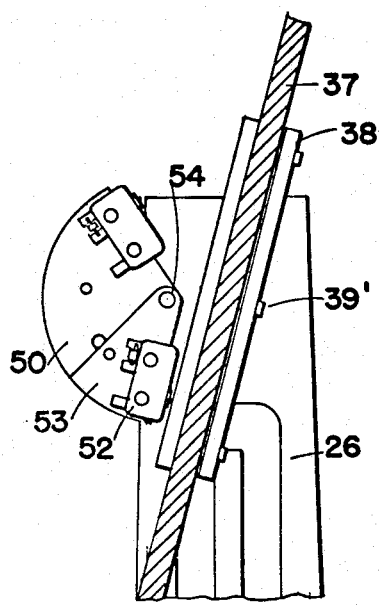
FIG. 4 is an enlarged fragmentary sectional view along the line 4—4 of FIG. 3.

Means are provided to limit the rotation of the mirror component around the horizontal axis 47, and in this regard reference should be made to FIG. 4.

A microswitch holder plate 50 is secured inboard of the upper end of one of the yoke arms 26 or 27 by means of set screws 51. In the present embodiment, this plate is secured inboard of the yoke arm 26.

Microswitches 52 are secured to mounting pads 53 and these in turn are secured to the plate 50 by means of the common mounting screw 54 so that the position of the two microswitches can be adjusted within limits relative to the plate and then can be clamped in position by means of the screw 54.

As the mirror component rotates around the horizontal axis 47, the clamp 38 strikes either of the microswitches 52 and one extreme position is shown in FIG. 4. The engagement of either of the microswitches by the clamp 38, cuts off the power from the electric motor 44 and stops rotation.

Figure 5:
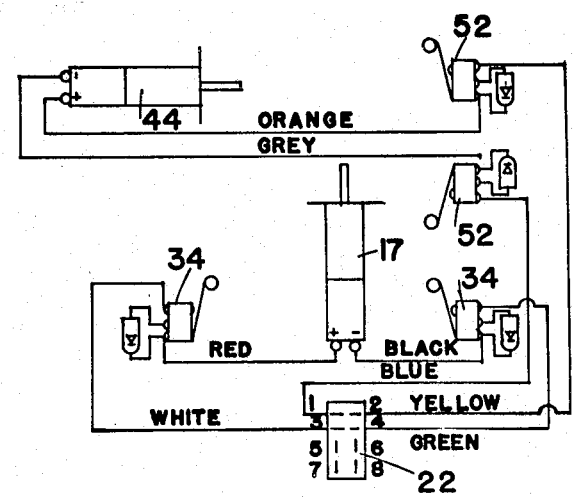
FIG. 5 is a wire diagram of the electrical components of the device.

FIG. 5 shows a wiring diagram, it being understood that the connector 22 may be connected to a source of electrical energy in the usual way.

The electric motors 17 and 44 are operatively connected to the connector 22 by electrical connectors as clearly illustrated, via the microswitches 34 and 52 respectively and as the wiring connections are conventional, it is not believed necessary to give further details.

From the foregoing it will be appreciated that by providing the two electric motors with variable speed controls (not illustrated), the mirror component can be rotated around the vertical axis 28 or the horizontal axis 47 either singly or in combination and an extremely smooth motion is ensured by the accuracy of the construction together with the friction pads 29 and 48 as hereinbefore described.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A mirror assembly in conjunction with a source of electrical energy and comprising in combination a base, a yoke extending upwardly from said base, first electric motor means connected to said source of electrical energy, a drive shaft for said first electric motor means, said drive shaft being operatively connected to said yoke for rotating said yoke within limits, around a first axis, a planar mirror component bearingly mounted within the arms of said yoke, and second electric motor means connected to said source of electrical energy, a drive shaft for said second electric motor means, said drive shaft being operatively connected to said mirror component for rotating same within limits, around a second axis within said yoke, at right angles to said first axis, said base including a central standard extending upwardly therefrom, said first electric motor being mounted within said standard, said yoke including a mounting shaft, a bearing in said standard above said first electric motor means, said mounting shaft being supported for rotation within said bearing and being operatively connected to the drive shaft of said first electric motor means, and means to control the degree of rotation of said yoke, said last mentioned means including a striker plate secured to said yoke, a pair of microswitches operatively connected between said first electric motor means and said source of electrical energy, and being engageable by said striker plate at the extremities of rotation of said yoke.

2. The assembly according to claim 1 in which said yoke includes a pair of substantially vertical spaced and parallel arms, a clamp engaging the opposite side edges of said mirror component, a shaft extending from one of said clamps, a bearing in one of said arms of said yoke engageable by said shaft, said second electric motor means being secured outboard of the other of said arms, said drive shaft of said second electric motor means being connected to the other of said clamps and means to limit the rotation of said mirror component around said horizontal axis.

3. The assembly according to claim 2 in which said last mentioned means includes a microswitch holder plate secured to one of said arms, a pair of microswitches on said plate and being operatively connected between said second electric motor means and the source of electrical energy, means to adjust said microswitches relative to said plate, one of said clamps engaging said microswitches at the extremities of rotation of said mirror component around said horizontal axis.

4. The assembly according to claim 1 which includes friction pad means between said mounting shaft and said central post to smooth out any irregularities of rotational movement between said yoke and said base.

5. The assembly according to claim 2 which includes friction pad means between said mounting shaft and said central standard to smooth out any irregularities of rotational movement between said yoke and said base.

6. The assembly according to claim 3 which includes friction pad means between said mounting shaft and said central standard to smooth out any irregularities of rotational movement between said yoke and said base.

* * * * *